United States Patent [19]

Macdonald et al.

[11] Patent Number: 4,790,236
[45] Date of Patent: Dec. 13, 1988

[54] FLOATING PISTON COUPLING FOR PLUNGER TYPE PUMPS

[75] Inventors: Scott Macdonald, Pleasant Hill; William D. Homberg, Oakland, both of Calif.

[73] Assignee: Beckman Instruments, Inc., Fullerton, Calif.

[21] Appl. No.: 530,930

[22] Filed: Sep. 12, 1983

[51] Int. Cl.[4] .................................................. F16J 1/10
[52] U.S. Cl. ......................................... 92/129; 92/167; 403/122
[58] Field of Search .................. 92/84, 129, 140, 167; 60/593; 417/568; 403/76, 122, 135, 138, 144; 464/103, 139, 147

[56] References Cited

U.S. PATENT DOCUMENTS

| 3,288,079 | 11/1966 | Kling | 417/568 |
| 3,311,030 | 3/1967 | Halstead | 92/167 |
| 3,372,647 | 3/1968 | Kling | 417/568 |
| 3,857,642 | 12/1974 | Miller | 92/129 |
| 4,023,803 | 5/1977 | Lewis | 403/135 |

FOREIGN PATENT DOCUMENTS 219471  5/1942  Switzerland ..................... 92/129

Primary Examiner—Abraham Hershkovitz
Attorney, Agent, or Firm—William H. May; Paul R. Harder

[57] ABSTRACT

A springless floating coupling for a plunger type pump connecting the drive plunger to a driven piston.

6 Claims, 1 Drawing Sheet

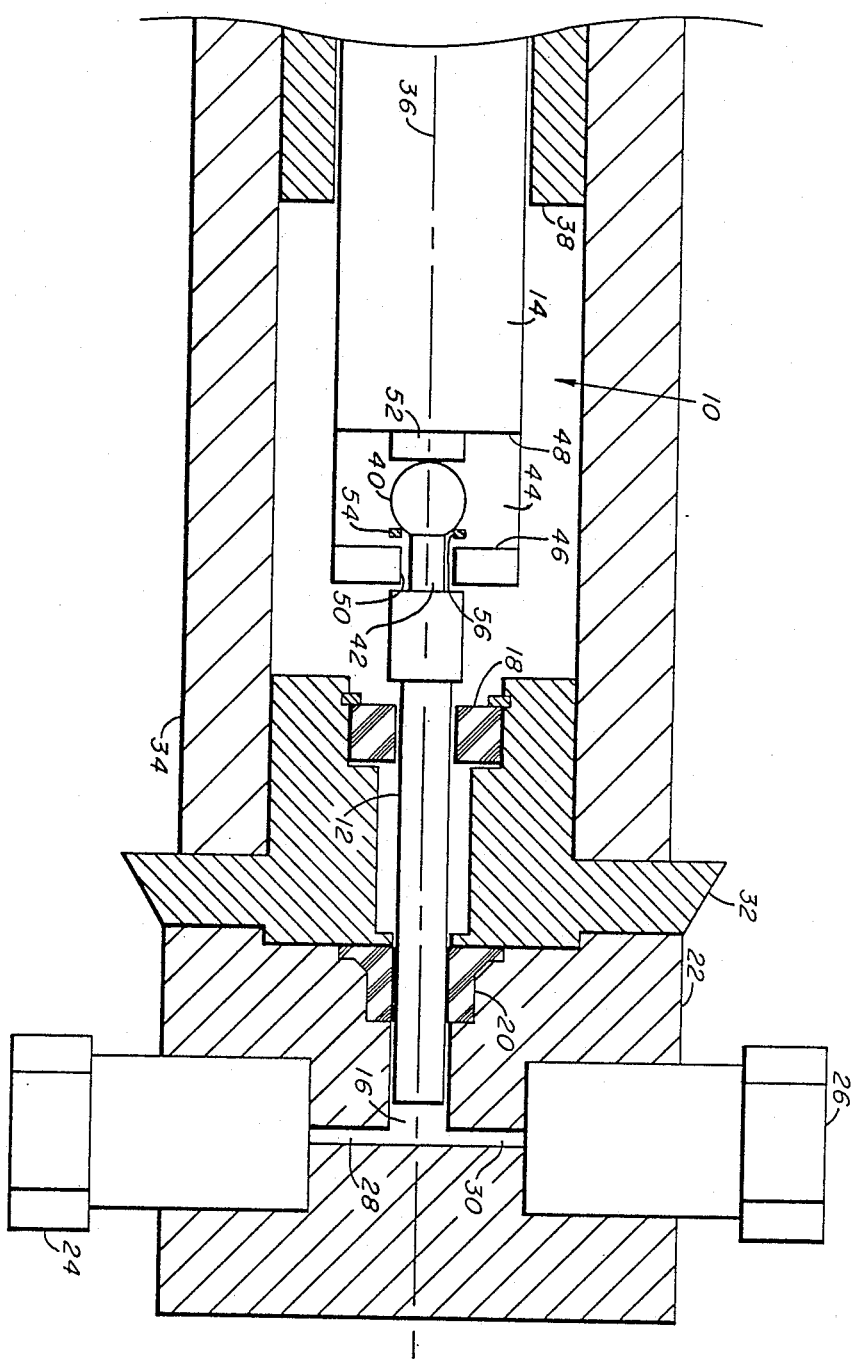

FLOATING PISTON COUPLING FOR PLUNGER TYPE PUMPS

BACKGROUND OF THE INVENTION

Floating couplings are commonly employed in plunger type pumps to connect the plunger or drive shaft of the pump to a driven piston mounted for reciprocating motion in a cylinder coaxial with the drive shaft. A floating coupling is utilized to minimize the effects of eccentric and angular misalignment between the piston drive mechanism and the piston which upon motion of the piston produces undesired wearing of the seals around and supporting the piston with incident fluid leakage therefrom. In the past, such floating couplings have included one or more spring members between the piston and the piston drive mechanism to maintain an extension from the piston included in the coupling in constant contact with the piston drive mechanism. In practice, such springs restrict the freedom of the piston to orient itself upon the occurrence of eccentric or angular misalignment between the piston and the piston driving mechanism. In particular, such springs introduce forces opposing movement of the piston in directions perpendicular to the axis of the piston drive mechanism. Further, the axial forces provided by the spring members may be uneven. In such instances, the spring members: may introduce forces normal to the preferred motion of the piston and further enhance the undesired wear of the associated seals and hence the incidence of undesired fluid leakage.

SUMMARY OF THE INVENTION

The present invention provides a springless floating piston coupling for transmitting linear motion from a drive shaft to a piston in a manner such that the effects of angular and eccentric misalignment of the members are minimized. In this regard, the coupling comprises a ball-like member received in a socket at the end of the piston drive shaft. The socket includes first and second opposing substantially parallel inner side walls normal to the longitudinal axis of the shaft and an opening in the first wall adjacent the piston and substantially coaxial with the longitudinal axis. The opening is dimensioned to loosely receive the connecting means between the ball and the piston to accommodate movement of the piston transverse to the shaft and pivotal movement of the piston with the ball bearing on the second wall. In addition, the coupling includes a washer carried by the connecting means between the ball and the piston. The washer resides between the ball and the first wall to engage the ball and to make flat sliding engagement with the first wall around the opening with relative movement of the shaft away rom the piston. Thus constructed, the floating coupling allows the piston to (i) pivot relative to the drive shaft with the ball engaging an end thereof, and (ii) move in a direction transverse to the shaft with the washer sliding on the first wall, thereby accommodating and compensating for eccentric and angular misalignment between the piston and the shaft.

BRIEF DESCRIPTION OF THE DRAWING

The single drawing illustrates a preferred form of the floating piston coupling of the present invention between the end portion of a drive shaft and a piston mounted for reciprocating motion within a cylinder of a plunger type pump.

DETAILED DESCRIPTION OF THE INVENTION

In the drawing, the floating piston coupling of the present invention is represented by the numeral 10. It connects a piston assembly 12 to a piston drive shaft or plunger 14 such that reciprocating motion of the drive shaft is coupled or transmitted through the coupling 10 to the piston 12.

Piston 12 is guided for longitudinal reciprocating motion within a cylinder 16 by a piston bearing 18 and a piston seal 20. The seal 20 is secured within the entry of the cylinder 16 to engage the piston and the inner side walls of the cylinder such that a fluid-tight seal is formed between the cylinder and the piston preventing fluid from leaking from the cylinder. The cylinder 16 is formed within a housing 22 carrying check valves 24 and 26 communicating by side port 28 and 30, respectively, with an end of the cylinder 16. Liquid is drawn into the cylinder through the inlet check valve 24 as the piston 12 is withdrawn from the cylinder. Liquid is expelled from the cylinder by operation of the check valve 26 upon movement of the piston toward the end wall of the cylinder.

The housing 22 is secured by a connecting plate 32 to the end of a housing 34 supporting the drive shaft 14. The connecting plate 32 includes an annular extension extending within the housing 34 and supporting the bearing 18 around the piston 12 and coaxial with the longitudinal axis 36 of the shaft 14 such that the piston 12 reciprocates within the cylinder 16 in line with the axis 36.

The drive shaft 14 is supported within the housing 34 for longitudinal reciprocating motion by an axial shaft bearing 38. The balance of the mechanism for reciprocating the drive shaft 14 is not illustrated but includes conventional structure such as a drive motor and associated means for converting the rotational output of the motor to linear reciprocating motion of the drive shaft 14.

As illustrated in the drawing, the springless floating coupling of the present invention preferably includes a sphere 40 or other ball-like member having similar forward and rearward facings substantially semispherical surfaces having a common center. The sphere 40 is preferably formed of a hard metal material and is connected to the exposed end of the shaft 12 by an extension 42. The extension is coaxial with the piston 12 and of slightly reduced cross-sectional area relative to the piston. The end of the extension is secured to the sphere 40 such that the axis of the extension and piston is in line with a center of the sphere.

As illustrated, the sphere 40 nests within a socket 44 formed in an end of the shaft 14. Preferably, the socket takes the form of a channel normal to the longitudinal axis 36 of the drive shaft 14 and having first and second substantially flat and parallel side walls 46 and 48. The side wall 46 includes a side slot 50 defined by an end opening in the shaft 14 coaxial therewith and dimensioned to loosely receive - the extension 42 with the sphere 40 in the channel. Thus arranged, the sphere 40 is adapted to engage a hardened metal button 52 secured to the side wall 48 coaxial with the axis 36 upon relative movement of the shaft toward the piston. The contact between the sphere 40 and the button 52 is essentially a point contact which accommodates pivotal movement of the piston with the sphere bearing on the button to compensate for angular misalignment between the shaft 14 and the piston 12.

In addition, the floating coupling includes a flat washer 54 having a circular central hole 56 therein. The washer is carried on the extension 42 between the sphere 40 and side wall 46. Thus positioned, one side of the washer makes flat sliding contact with the side wall 46 while an annular portion of an opposite side of the washer around the central opening engages the sphere 40. This allows the piston to move in a direction transverse to the longitudinal axis 36 with the washer sliding on the wall 46 to compensate for eccentric misalignment between the drive shaft 14 and the piston 12.

Preferably, the coupling 10 including channel defining the socket 44, the button 52, the sphere 40, and the washer 54 are dimensioned such that there is only a slight clearance for relative axial movement between the sphere and the button—just enough to accommodate movement of the piston 12 transverse to the axis 36 to compensate for eccentric misalignment while the piston is inclined relative to the axis 36 to compensate for angular misalignment. In the preferred design illustrated herein, where the forward and rear faces of ball-like member are semispherical and have a common center, the desired clearance will remain vertically constant independent of the angular relationship between the piston and the shaft since the distances between the contact point of the sphere 40 and button 52 and the sphere and washer 54 will remain constant.

We claim:

1. In a pump including a shaft supported by shaft bearing means for longitudinal reciprocating motion and a piston supported by guide means for longitudinal reciprocating motion within a cylinder substantially in line with the shaft, a springless floating coupling between the shaft and the piston, comprising:

a spherical member connected to an end of the said piston opposing said cylinder and having semispherical surfaces facing toward and away from the piston;

a socket formed in an end of said shaft for receiving said spherical member and having first and second opposing substantially parallel inner walls normal to a longitudinal axis of the shaft and having an opening in the first outermost wall nearest to said piston and substantially coaxial with the longitudinal axis of said shaft, said opening dimensioned to loosely receive a portion of said piston adjacent to the connection of said spherical member to said piston to accommodate pivotal and transverse movement of said piston relative to said shaft; and a bearing means positioned around the portion of said piston adjacent to the connection of said spherical member to said piston and between the semi-spherical surface of said spherical member facing toward said piston and the first wall of said socket to transmit force between said spherical member and said first wall of the shaft when said piston is withdrawn from said cylinder by withdrawing movement of said shaft, with transverse and pivotal freedom of movement between said piston and said shaft.

2. The coupling of claim 1 wherein the portion of said piston adjacent to the connection of said spherical member further includes a coaxial extending member between said piston and said spherical member, and defining means for connecting the spherical member to the piston, and said extending member extending through the opening of the first wall of said socket and carrying said bearing means between the spherical member and the first wall of said shaft.

3. The coupling of claim 2 wherein
said extending member is cylindrical in shape and smaller in cross-section than the diameter of said spherical member, and
said bearing member comprises a circular central opening through which the extending member extends whereby one side of the bearing means makes sliding contact with the first wall of said shaft and an annular portion of the opposing side of said bearing member around the central opening engages the spherical member.

4. The coupling of claim 2 wherein the inner walls are spaced to provide relative movement of said spherical member within the socket in said shaft sufficient to accommodate pivotal and transverse movement of said piston relative to said shaft.

5. The coupling of claim 4 wherein the semi-spherical surfaces of the spherical member have a common center.

6. In a plunger type pump including a shaft supported by axial bearing means for longitudinal reciprocating motion and a piston supported by bearing means for longitudinal reciprocating motion in a cylinder substantially in line with the shaft, a springless floating coupling between the shaft and the piston comprising:

a sphere;

a coaxial extension from the piston mounting said sphere to said piston with the axis of said piston in line with a center of said sphere;

a channel having substantially parallel first and second side walls in an end portion of the shaft adjacent the piston and normal to the longitudinal axis of the shaft and including a side slot in the first outermost side wall defined by an end opening in the shaft coaxial therewith, said slot loosely receiving the extension from said piston with said sphere in the channel to transmit force between the first and second side walls upon reciprocal movement of the shaft; and a flat bearing washer having a central circular hole therein, said washer carried by the extension between the piston and the sphere, to engage the sphere and to make sliding engagement with the first side wall about the side slot permitting pivotal movement therebetween with relative movement of the shaft away from the piston.

* * * * *